[19] United States Patent
Ast

[11] 4,187,403
[45] Feb. 5, 1980

[54] VOICE-PROTECTED, FREQUENCY-SELECTIVE SIGNAL RECEIVER

[75] Inventor: Reinhold Ast, Unterpfaffenhofen, Fed. Rep. of Germany

[73] Assignee: Siemens Aktiengesellschaft, Berlin & Munich, Fed. Rep. of Germany

[21] Appl. No.: 886,957

[22] Filed: Mar. 15, 1978

[30] Foreign Application Priority Data

Mar. 23, 1977 [DE] Fed. Rep. of Germany ....... 2712847

[51] Int. Cl.² .................. H04M 1/50; G01R 23/14
[52] U.S. Cl. .............................. 179/84 VF; 324/78 D
[58] Field of Search ............... 179/84 VF; 324/78 D; 328/138; 340/171 R

[56] References Cited
U.S. PATENT DOCUMENTS 3,537,001  10/1970  Friend ............................. 179/84 VF

FOREIGN PATENT DOCUMENTS 2422840 12/1975 Fed. Rep. of Germany ...... 179/84 VF
1364773  8/1974 United Kingdom ............... 179/84 VF Primary Examiner—Bernard Konick
Assistant Examiner—Joseph A. Popek
Attorney, Agent, or Firm—Hill, Van Santen, Steadman, Chiara & Simpson

[57] ABSTRACT

A voice-protected, frequency-selective signal receiver for signals which consist of several simultaneously occurring individual frequencies, includes circuits for converting the received analog sum signal into a beat pulse pattern of positive and negative pulses of equal amplitude. The time interval between two pulses of identical operational signal and identical duration is determined, since this time interval corresponds to the duration of the sum signal and thus represents a clear criterion for the signal to be received. The signal receiver is utilized to advantage in multi-frequency code receivers in telecommunication systems, particularly telephone systems.

2 Claims, 3 Drawing Figures

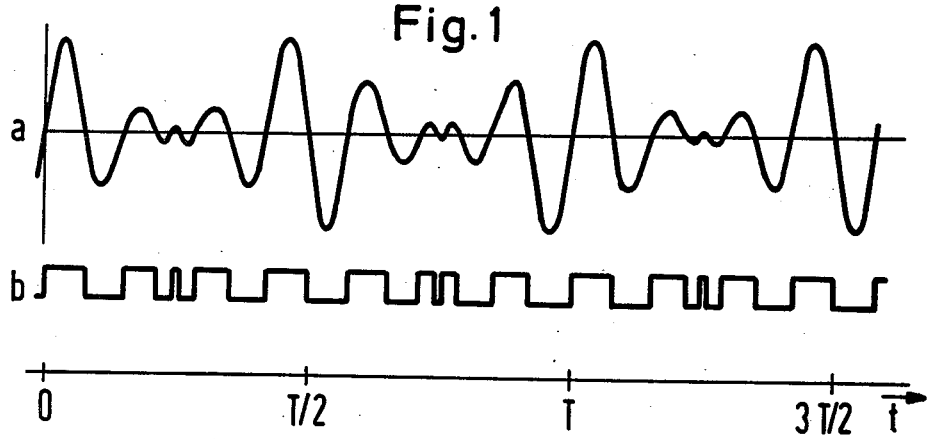
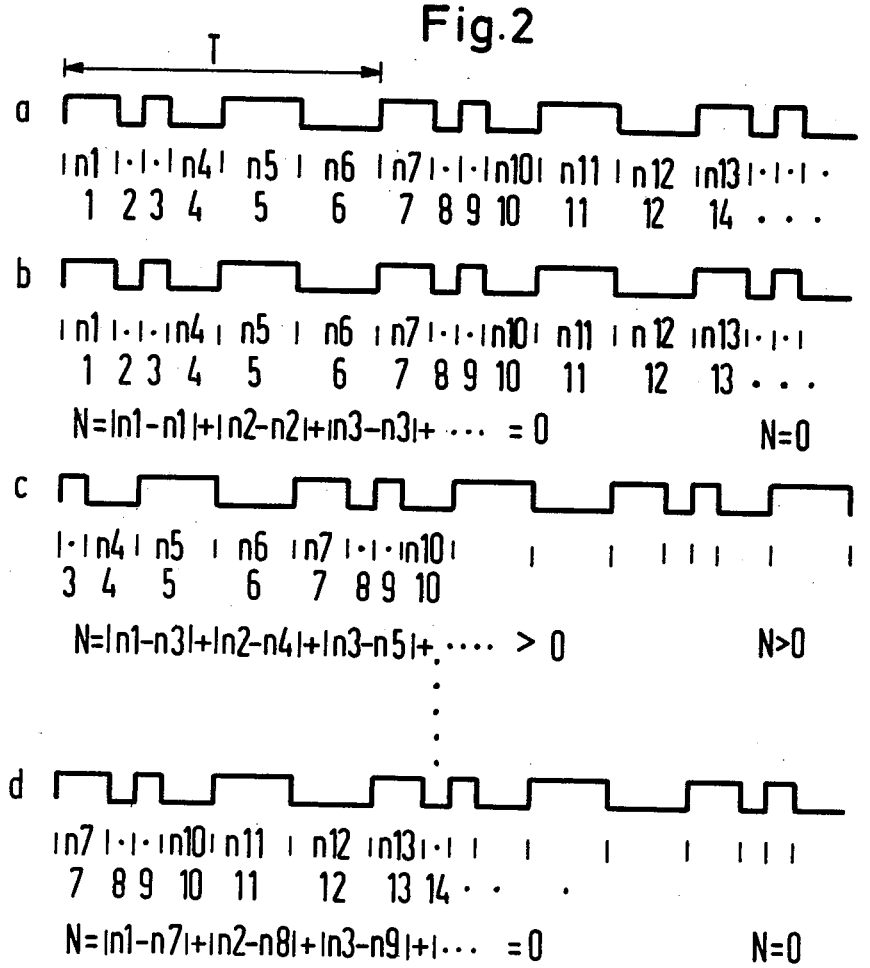

VOICE-PROTECTED, FREQUENCY-SELECTIVE SIGNAL RECEIVER

BACKGROUND OF THE INVENTION

1. Field of the Invention

The present invention relates to a voice-protected, frequency-selective signal receiver for telecommunication systems, in particular telephone systems, in which the signals to be received consist of several simultaneously occurring individual frequencies.

2. Description of the Prior Art

In telephony the dialing and signaling tasks are accomplished with the aid of multi-frequency code signals, with each signal consisting of a combination of two frequencies. In accordance with the particular code utilized, previously known receivers operate with filter arrangements for separating the frequency components, which are substantially further processed on an individual basis. Because of the high requirements with respect to mutual blocking attenuation, for example because of necessary voice protection measures, filters of relatively great slope are required, which filters are very expensive to produce and require considerable space.

SUMMARY OF THE INVENTION

The object of the present invention is to provide a voice-protected, frequency-selective signal receiver which requires no expensive filter arrangements.

According to the invention, the foregoing object is achieved, in a signal receiver of the type mentioned above, in that the analog sum signal composed of the individual frequencies is converted into a digital signal comprising positive and negative pulses of equal amplitude, with the duration of the individual pulses being equal to the respective interval between two successive zero passages of the analog sum signal, and that, for determining the duration of the digital signal, the time interval between two pulses of identical operational sign and identical duration is determined.

A multi-frequency code signal consists of a linear addition of two or more sine oscillations of different frequency in the form of a beat. Computer-based studies have shown that each beat has its own characteristics, which characteristics are primarily determined by its individual oscillations. The start phase position merely causes a time shift of the beat image. Given amplitude differences of the individual oscillations up to about 6 dB the beat in each does not change, to be sure, whereas the period of the beat, on the other hand, changes only slightly. Consequently, the period duration is a characteristic for a beat composed of specific individual oscillations and can be used for the evaluation of the frequencies of the individual oscillations contained therein. A multi-frequency code signal can thus be recognized in that the period duration of the appertaining beat is determined and, subsequently, there is an examination as to whether the latter is characteristic for one of the multi-frequency code signals.

Because, with this type of evaluation, the analog sum signal can be converted directly into a digital signal, i.e. without filters to split the signal into the individual frequency components, a signal receiver constructed in accordance with the present invention does not require expensive filter arrangements, but rather can be equipped completely with integratable digital circuit arrangements.

A particular feature of a signal receiver constructed in accordance with the present invention is that each pulse has a whole number $n_i$ associated therewith, which number is proportional to the duration of the pulse, that these numbers are simultaneously read in, as a number sequence, into two memories over a prescribed time Tm, with an address being assigned to each number, and that the memory content of the second memory is compared with the memory content of the first memory in several passes such that, in each case, the difference of the individual stored numbers is formed, with the content of the second memory being shifted by two address contents after each pass, and simultaneously for each pass this shift, as a sum of the shifted address contents, and the sum of the differences are determined. If a predetermined minimum sum of the differences fails to be reached, the determined shift is released, as a measure of the period duration of the digital signal, for evaluation. In this manner the period duration can be determined in a simple manner. For example, integrated semiconductor memories having arbitrary access, so-called random access memories (RAM) can be used for the memories, so that, the overall space requirement is small and a high reliability is attained.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a graphic illustration of a two-frequency signal;

FIG. 2 illustrates, with waveforms, the evaluation principle for determining the period duration.

DESCRIPTION OF THE PREFERRED EMBODIMENTS

Figure 3:
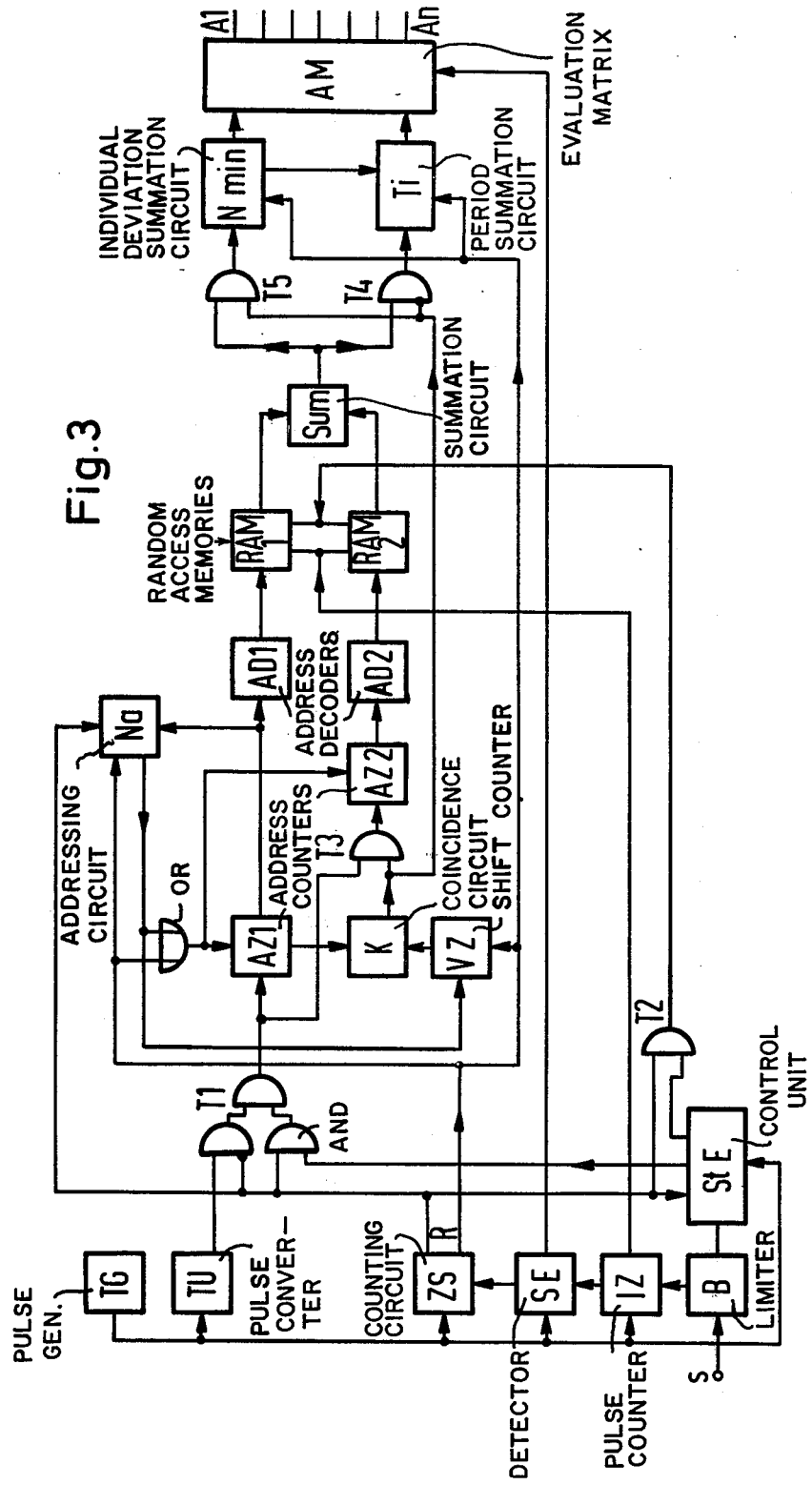
FIG. 3 is a basic schematic diagram of an exemplary embodiment of a signal receiver constructed in accordance with the invention.

FIG. 1a illustrates the fundamental time pattern of a two-frequency signal, in which it is presupposed that both individual oscillations have the same amplitude.

FIG. 1b illustrates, in digitalized form, the beat represented in FIG. 1a. The digital signal is a series of alternating positive and negative pulses of different length. The length of a pulse can be expressed as a number, as indicated in FIG. 2, by the expression n1, n2, n3, etc. The periodicity of the digital signal may be recognized in that, in the interval of the period duration T, pulses of equal length or, respectively, equally large numbers, are encountered. Therefore, in the example illustrated in FIG. 2, n1=n7=n13 and, respectively, n3=n9.

The input signal is simultaneously read in, as a number sequence, over a prescribed time Tm which is governed by the lowest frequency to be determined, into two memories, i.e. in the exemplary embodiment illustrated herein, into the memory RAM1 and into the memory RAM2 (FIG. 3). In the process, as indicated in FIG. 2, an address is assigned in the memory into each whole number. If the read-in memory contents, i.e. the two number sequences as they are represented in FIGS. 2a and 2b, are compared with one another, then the deviation N of the two number sequences is equal to zero. However, because of the periodicity of the signal, the deviation N will also be zero when the content of the first memory RAM1 is compared to the content of the second memory RAM2, which has been shifted by the period duration T, as is illustrated in FIG. 2d. With each further shifting by the period duration T of the content of the memory RAM2, the comparison of the contents of the two memories will also yield the deviation N=0.

In order to determine the period duration T of the input signal, the contents of the two memories are compared with one another several times; and during each comparison not only the shift of the content of the memory RAM2 vis-a-vis the content of the memory RAM1, but also the deviation N are determined. On the first the shift is equal to zero and thus the deviation N is also equal to zero. So that pulses of equal polarity are always compared with one another, each shift always amounts to two address contents. During the second pass, which is represented in FIG. 2c, the sum of the contents of the first two memory addresses of the memory RAM2, namely n1+n2, is formed and stored as a shift. The following address contents are compared with the contents of the memory RAM1, and from that the deviation N is formed, as indicated in FIG. 2c. FIG. 2d shows one of the following passes, in which the shift equals n1+n2+n3+n4+n5+n6, i.e. it amounts to a full period duration T, while the deviation N=0. Therefore, for the practical realization, all that is needed is a circuit which determines the smallest deviation N, which is equal to zero in the ideal case, and, in the process, retains the shift, which then corresponds to the period duration T. Subsequently, the determined magnitude is to then be assigned to one of the code signals.

In FIG. 3, a block circuit diagram of an exemplary embodiment of a signal receiver is represented, in which the described evaluation principle is utilized according to the present invention. In the circuit arrangement of FIG. 3, only the individual circuits necessary for an understanding of the invention are represented. A limiter circuit B converts the analog input signals, i.e. the analog beat pulses required by the individual component groups. With the exception of the limiter B, the remaining circuit components are synchronized by a clock TG.

The digital signal produced by the limiter circuit B is fed to a pulse counter IZ which converts the individual pulses into a number having an operating sign. These numbers are fed to the two memories RAM1 and RAM2. Simultaneously, these numbers are fed to a detector circuit SE which compares these numbers with prescribed limit values. If two successive numbers are situated with their absolute value between prescribed limits, it is assumed that a beat is present at the input of the receiver, and the actual evaluation operation is initiated.

The evaluation operation comprises three time segments, namely a lead time, a write-in time Tm and the actual evaluation time. With the aid of the lead time, a possibly existing transient phenomenon is taken into consideration. During the write-in time Tm, the number sequence supplied by the pulse counter IZ is written into the two memories. Within the actual evaluation time, the comparison of the two memory contents is performed.

The beginning and the duration of the write-in time Tm is determined by a counting circuit ZS, which generates the lead time and the write-in time from the pulse fed thereto.

In addition, the counting circuit ZS generates a total reset pulse R at the beginning and at the end of the write-in time Tm. With the beginning of the write-in time Tm, a control unit StE is switched on and supplies the necessary address pulses. The address pulses are fed to an address counter AZ1, via a gate circuit T1, and to an address counter AZ2 via the gate circuit T1 and a gate circuit T3. After each address pulse, the control unit StE generates writing pulses which are fed, via a gate T2 to the two memories RAM1 and RAM2, and which ensure that the numbers supplied by the pulse counter IZ are written into the two memories at the corresponding address.

The gate circuit T1 controls the addressing of the two memories RAM1 and RAM2. During the writing-in time Tm, the two memories are addressed, via the address counters AZ1 and AZ2 and a pair of associated respective address decoder circuits AD1 and AD2, with writein pulses at each edge change of the signal at the output of the limiter circuit B. During the evaluation time, the addressing occurs with timing pulses applied by a pulse converter TU, i.e. at a faster pulse rate.

The address counters AZ1 and AZ2 may be simple counters which address the two memories in the sequence 1, 2, 3, . . . . The address decoder circuits AD1 and AD2 convert the output signals of the address counters AZ1 and AZ2 into the code for the memory addresses, depending upon the type of memories used. An addressing circuit Na counts the address pulses during the write-in time Tm. At the conclusion of the write-in time Tm, the addressing circuit Na receives and stores the count of the address counter AZ1. During the actual evaluation time, the two memories RAM1 and RAM2 are individually interrogated. In this process, the memory RAM1 is always interrogated in the sequence 1, 2, 3, . . . up to the maximum address stored in the addressing circuit Na. The memory RAM2 is interrogated after each pass, in each case shifted by two address contents, i.e. in the sequence 3, 4, 5, . . . ; 5, 6, 7 . . . ; 7, 8, 9 . . . etc. These work sequences are ensured by the addressing circuit Na. Whenever the address counter AZ1 has reached the maximum address value stored in the addressing circuit Na, the addressing circuit Na emits a reset pulse which resets the address counters AZ1 and AZ2, and simultaneously serves as a counting pulse for a shift counter VZ. The shift counter VZ is a counting circuit which, by means of the counting pulse, counts along respectively by the amount 2, i.e. in the sequence 2, 4, 6, 8, etc.

The counts of the address counter AZ1 and of the shift counter VZ are compared with each other in a coincidence circuit K. If the count of the address counter AZ1 is smaller than that of the shift counter VZ, the coincidence circuit K blocks the gate T3 and, in that manner, the addressing of the memory RAM2. If, on the other hand, the count of the address counter AZ1 is greater than the count of the shift counter VZ, the addressing for the memory RAM2 is released via the gate T3. In this manner, the coincidence circuit K ensures that the memory RAM2 is addressed delayed by the number present in the shift counter VZ, in relation to the memory RAM1.

A summation circuit Sum is provided in which the differences of the respectively stored number values are formed. Before a signal is available at the output of the coincidence circuit K, the value for the shift is formed in the summation circuit Sum, since the memory RAM2 is not addressed. Once a signal is available at the output of the coincidence circuit K, the individual deviations of the numbers stored under the respective addresses are formed.

At the same time, the gate circuits T4 and T5 are switched with the output signal of the coincidence circuit K. By way of the gate circuits T4 and T5 the value formed by the summation circuit Sum is fed either to a summation circuit Nmin or to a period summer Ti. The summation circuit Nmin forms the sum of the individual deviations supplied by the summation circuit Sum, i.e. the total deviation of the two memory contents. If this sum is below a predetermined limit, a coincidence is present of the pulse patterns written into the two memories. If the sum is below this predetermined limit, the period summer Ti is reset. During the next pass, the deviation becomes larger again, until, after a number of passes, the predetermined limit again fails to be reached. If the given limit fails to be reached a second time, the shift summed-up in the period summer Ti, which corresponds to the period duration of the received beat, is transferred into an evaluation matrix AM.

In the evaluation matrix AM there is an examination as to whether the shift received from the period summer Ti, and the maximum number supplied by the detector unit SE are to be assigned to one of the beats to be evaluated. If that is the case, one of the corresponding outputs A1-An is activated, so that the result is available for further processing.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A voice-protected, frequency-selective signal receiver for telecommunications systems, in which the received signals comprise simultaneously occurring and beating individual frequencies forming a beat frequency analog sum signal, comprising:

means for converting said beat frequency analog sum signal into a digital signal of positive and negative pulses of equal amplitude with the duration of the individual pulses being equal to the spacings of the respective two successive zero crossings of the beat frequency analog sum signal; and means for determining the period duration of the pulses of the digital signal, including means for determining the time interval between two pulses of the same polarity and the same duration.

2. The signal receiver of claim 1, comprising:

first and second memories;

means for assigning a whole number to each pulse proportional to the duration of the pulse;

means assigning memory addresses to each of said numbers;

means for simultaneously writing the numbers representing the digital signal, as a number sequence, into said first and second memories during a prescribed time interval;

means for comparing the content of said first memory with the content of said second memory several times, including means for shifting the content of said second memory after each comparison by two contents to obtain the difference of the individually stored numbers;

means for providing the sum of the differences; and means for releasing a selected signal for evaluation in response to the sum of the differences being less than a predetermined value.

* * * * *